(12) United States Patent
Harries

(10) Patent No.: US 6,637,282 B2
(45) Date of Patent: Oct. 28, 2003

(54) HYDRAULIC ACTUATION SYSTEMS

(75) Inventor: David Anthony Harries, Stratford upon Avon (GB)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/054,688

(22) Filed: Nov. 13, 2001

(65) Prior Publication Data

US 2002/0112552 A1 Aug. 22, 2002

(30) Foreign Application Priority Data

Nov. 13, 2000 (GB) .............................................. 0027640

(51) Int. Cl.[7] .............................................. F16H 63/02
(52) U.S. Cl. ......................................................... 74/335
(58) Field of Search .............................. 74/335, 336 R, 74/473.11

(56) References Cited

U.S. PATENT DOCUMENTS

| | | | | |
|---|---|---|---|---|
| 5,836,207 A | * | 11/1998 | Spooner et al. ................ | 74/335 |
| 6,102,829 A | * | 8/2000 | Muddell et al. ............... | 74/335 |
| 6,131,476 A | * | 10/2000 | Miyazaki ....................... | 74/355 |
| 6,257,081 B1 | * | 7/2001 | Gagnon et al. ................ | 74/335 |
| 6,276,224 B1 | * | 8/2001 | Ueda et al. ..................... | 74/335 |
| 6,295,884 B1 | * | 10/2001 | Miyake et al. ................. | 74/335 |
| 6,327,529 B1 | * | 12/2001 | Ore .............................. | 74/355 |
| 6,446,522 B1 | * | 9/2002 | Warren et al. ................. | 74/355 |

FOREIGN PATENT DOCUMENTS

| | | |
|---|---|---|
| EP | 0043 660 | 4/1986 |
| EP | 0038113 | 7/1986 |
| EP | 0059035 | 1/1987 |
| EP | 0101 220 | 1/1987 |
| GB | 0005186 | 3/2000 |
| GB | 0024999.5 | 10/2000 |
| GB | 0025000.1 | 10/2000 |
| WO | WO 92/13208 | 8/1992 |
| WO | WO 97/05410 | 2/1997 |
| WO | WO 97/40300 | 10/1997 |

* cited by examiner

*Primary Examiner*—Sherry Estremsky
(74) *Attorney, Agent, or Firm*—Darby & Darby

(57) ABSTRACT

A hydraulic actuation system for an automated transmission system includes; a hydraulic fluid accumulator (275), a hydraulic fluid reservoir (278), a clutch slave cylinder 22 and gear engagement select and shift actuators (114, 115); the clutch slave cylinder (22) and select and shift actuators (114, 115) are selectively connected to the accumulator (275) or to the reservoir (278) via a main control solenoid valve (120); a further clutch control solenoid valve (122) being connected between the main control valve (120) and the clutch slave cylinder (22), the clutch control valve (122) being switchable between a open position in which slave cylinder (22) is connected to the main control valve (120) and a closed position in which the clutch slave cylinder (22) is isolated from the main control valve (120); the working chambers (118, 119) of the select and shift actuators (114, 115) being selectively connected to the main control valve (120) or to the reservoir (278) via gear control solenoid valves (144, 145, 146, 147).

14 Claims, 4 Drawing Sheets

HYDRAULIC ACTUATION SYSTEMS

This invention relates to hydraulic actuation systems and in particular hydraulic actuation systems for automated transmission systems.

BACKGROUND

In automated transmission systems of, for example, the type disclosed in WO97/05410; WO97/40300: GB0005186.2; GB0024999.5 or GB0025000.1, whose content is expressly incorporated in the disclosure content of the present application, fluid pressure actuators are used to control actuation of a clutch actuator mechanism and/or a gear engaging mechanism.

In such systems solenoid control valves are used to control flow of fluid to and from the fluid pressure actuators, so as to control actuation of the clutch and the gear engagement mechanism.

With increasing sophistication of such systems, three or four proportional flow control valves are typically used to control the system. These control valves are normally spool valves having multiple lands and ports. Moreover the valves must be controlled typically to move between three or four positions. These valves are as a consequence relatively expensive and require complex electronic control systems, which adds considerably to the overall cost of the hydraulic actuation system.

SUMMARY

The present invention provides a simplified hydraulic actuation system with a view to reducing the cost and complexity of the system.

According to one aspect of the present a hydraulic actuation system for an automated transmission system comprises:

a source of hydraulic fluid under pressure;

a hydraulic fluid reservoir;

a hydraulic clutch actuator for controlling engagement of a clutch, said hydraulic clutch actuator comprising a single acting ram with a single working chamber;

a hydraulic gear engagement actuator for controlling engagement of a gear, said hydraulic gear engagement actuator comprising a double acting ram comprising first and second working chambers;

a main control valve, the main control valve being switchable between a first position in which the clutch actuator and gear engagement actuator are connected to the source of fluid under pressure and a second position in which the clutch actuator and gear engagement actuator are connected to the reservoir;

the working chamber of the clutch actuator being connected to the main control valve via a clutch control valve, the clutch control valve being switchable between a open position in which the working chamber of the clutch actuator is connected to the main control valve and a closed position in which the working chamber of the clutch actuator is isolated from the main control valve;

the first and second working chambers of the gear engagement actuator being selectively connected to the main control valve or to the reservoir via first and second gear control valves respectively.

The hydraulic actuating system described above replaces the complex proportional flow control valves used hitherto with simple two position solenoid control valves. Even though this entails the use of more valves, this will nethertheless reduce to overall cost of the system and significantly simplify the electronic control system required to control the valves. The main control valve permits the system to be depressurised and reduces the number of potential leakage points, when the system is not in use.

According to a preferred embodiment of the invention a pair of gear engagement actuators are used, a select actuator to control movement of a selector mechanism in a first "select" direction and a shift actuator to control movement of the selector mechanism in a second "shift" direction. Each of the select and shift actuators are provided with first and second gear control valves.

BRIEF DESCRIPTION OF THE DRAWINGS & FIGURES

The invention is now described by way of example only, with reference to the accompanying drawings, in which.

DETAILED DESCRIPTION OF PREFERRED EMBODIMENTS

Figure 1:
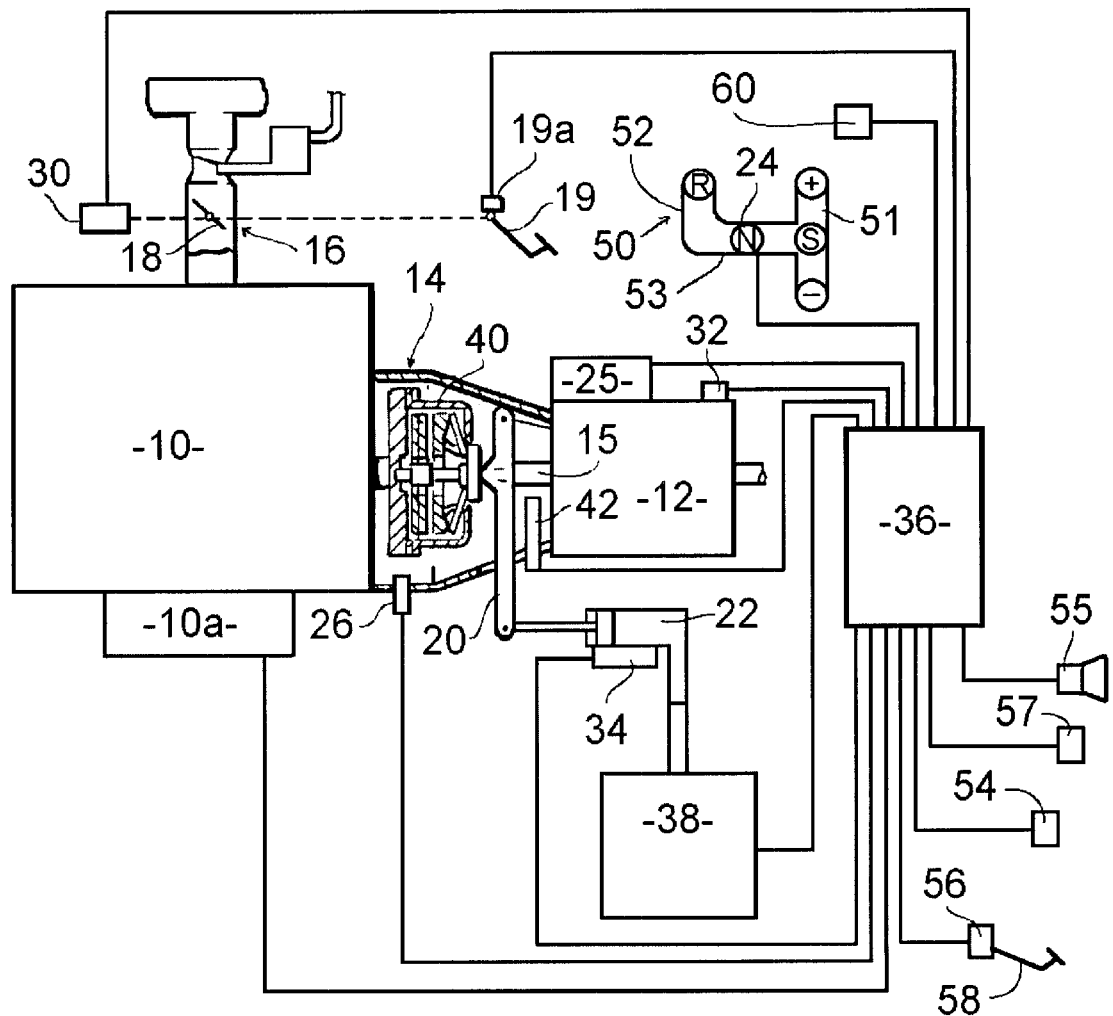
FIG. 1 shows diagrammatically a semi-automated transmission system utilising a hydraulic actuation system in accordance with the present invention.

FIG. 1 of the accompanying drawings shows an engine 10 with a starter and associated starter circuit 10a which is coupled through the main drive friction clutch 14 to a multi-speed synchromeshed lay shaft-type gearbox 12, via a gearbox input shaft 15. Fuel is supplied to the engine by a throttle 16 which includes a throttle valve 18, operated by accelerator pedal 19. The invention is equally applicable to electronic or mechanical fuel injection petrol or diesel engine.

The clutch 14 is actuated by a release fork 20 which is operated by a hydraulic slave cylinder 22 in the form of a single acting ram with a single working chamber 23, under the control of a clutch actuator control means 38.

A gear selector lever 24 operates in a gate 50 having two limbs 51 and 52 joined by a cross track 53 extending between the end of limb 52 and intermediate of the ends of limb 51. The gate 50 defines five positions; "R" at the end of limb 52; "N" intermediate of the ends of the cross track 53; "S" at the junction of limb 51 with the cross track 53; and "+" and "−" at the extremities of limb 51. In limb 51 the lever 24 is biased to the central "S" position. The "N" position of the selector lever 24 corresponds to neutral; "R" corresponds to selection of reverse gear; "S" corresponds to selection of a forward drive mode; momentary movement of the lever to the "+" position provides a command to cause the gearbox to shift up one gear ratio; and momentary movement of the gear lever 24 to the "−" position provides a command to cause the gearbox to shift down one gear ratio.

The positions of the lever 24 are sensed by a series of sensors, for example micro switches or optical sensors, positioned around the gate 50. Signals from the sensors are fed to an electronic control unit 36. An output from the control unit 36 controls a gear engaging mechanism 25, which engages the gear ratios of the gearbox 12, in accordance with movement of the selector lever 24 by the vehicle operator.

In addition to signals from the gear selector lever 24, the control unit 36 receives signals from:

- sensor 19a indicative of the degree of depression of the accelerator pedal 19;
- sensor 30 indicative of the degree of opening of the throttle control valve 18;
- sensor 26 indicative of the engine speed;
- sensor 42 indicative of the speed of the clutch driven plate; and
- sensor 34 indicative of the clutch slave cylinder position.

The control unit 36 utilises the signals from these sensors to control actuation of the clutch 14 during take-up from rest and gear changes, for example as described in patent specifications EP0038113, EP0043660, EP0059035, EP0101220 and WO92/13208 whose content is expressly incorporated in the disclosure content of the present application.

In addition to the above mentioned sensors, control unit 36 also receives signals from a vehicle speed sensor 57, ignition switch 54 and brake switch 56 associated with the main braking system, for example the footbrake 58 of the vehicle.

A buzzer 55 is connected to the control unit 36 to warn/indicate to the vehicle operator as certain operating conditions occur. In addition or in place of the buzzer 55 a flashing warning light or other indicating means may be used. A gear indicator 60 is also provided to indicate the gear ratio selected.

Figure 2:
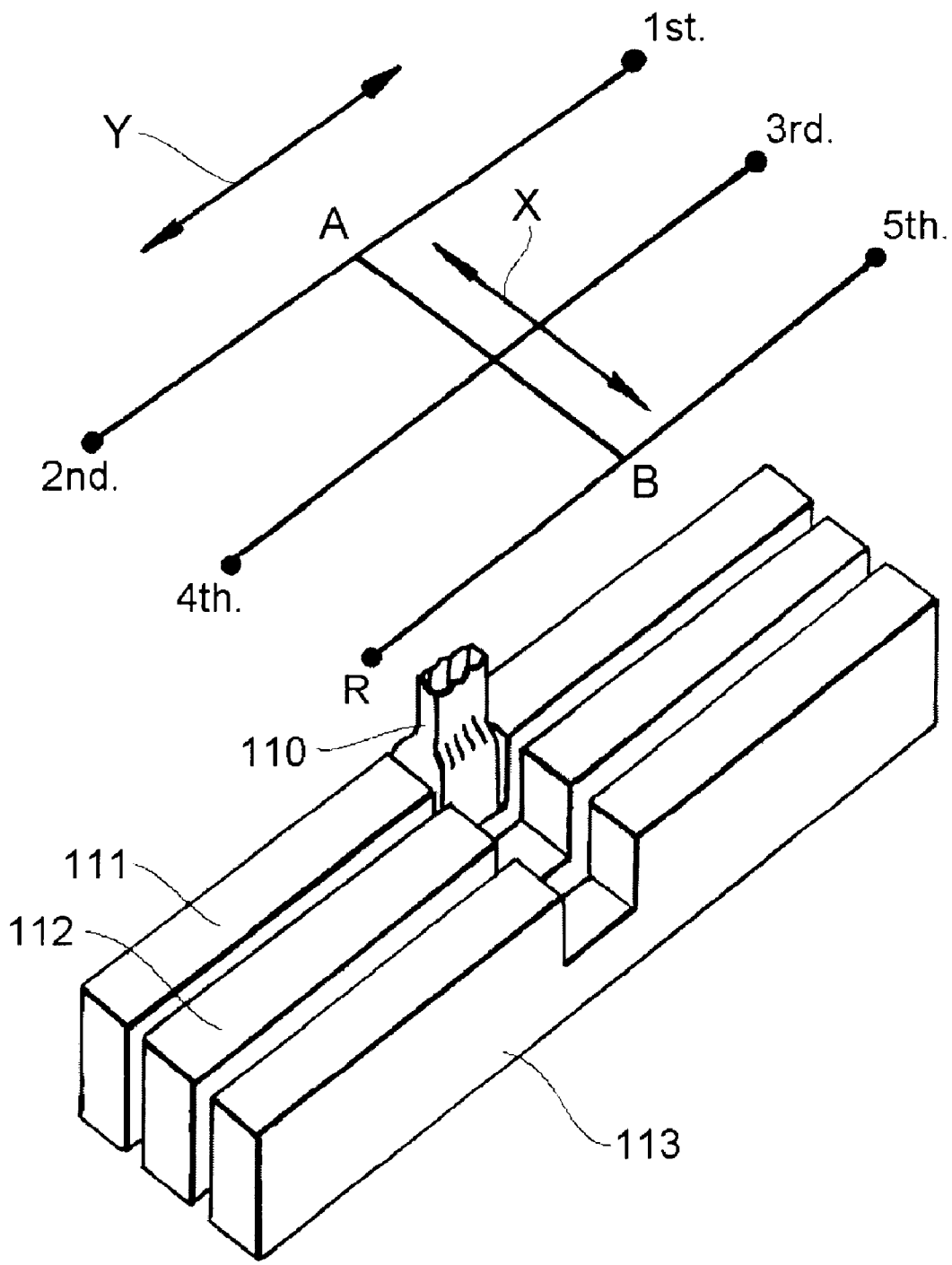
FIG. 2 shows a gear selector mechanism and associated selector gate of the transmission system illustrated in FIG. 1.

As illustrated in FIG. 2, the gear engagement mechanism 25 comprises three shift rails 111, 112, 113 mounted parallel to one another for movement in an axial direction. Each shift rail 111, 112, 113 is associated with two of the gear ratios of the gearbox 12, via a selector fork and synchromesh unit in conventional manner, so that movement of the shift rails 111, 112, 113 in one axial direction will cause engagement of one of the associated gear ratios and axial movement of the shift rail 111, 112, 113 in the opposite axial direction will cause engagement of the other associated gear ratio.

Typically; first and second gear ratios are associated with shift rail 111, so that axial movement of the shift rail 111 in a first direction will engage first gear or axial movement of shift rail 111 in a second direction will engage second gear; third and fourth gear ratios are associated with shift rail 112, so that axial movement of shift rail 112 in the first direction will engage third gear or axial movement of shift 112 in a second direction will engage fourth gear; and fifth and reverse gear ratios are associated with shift rail 113, so that axial movement of shift rail 113 in the first direction will engage fifth gear while axial movement of shift rail 113 in the second direction will engage reverse gear.

A selector member 110 is mounted for movement in a select direction X transverse to the axes of the shift rails 111, 112, 113 and in a shift direction Y, for movement axially of the shift rails 111, 112 and 113. The selector member 110 may thus be moved in direction X along a neutral plane A-B, so that it may be indexed with and engaged a selected one of the shift rails 111, 112 and 113. The selector member 110 may then be moved in direction Y to move the engaged shift rail 111, 112, 113 axially in either direction to engage one of the gear ratios associated therewith.

Figure 3:
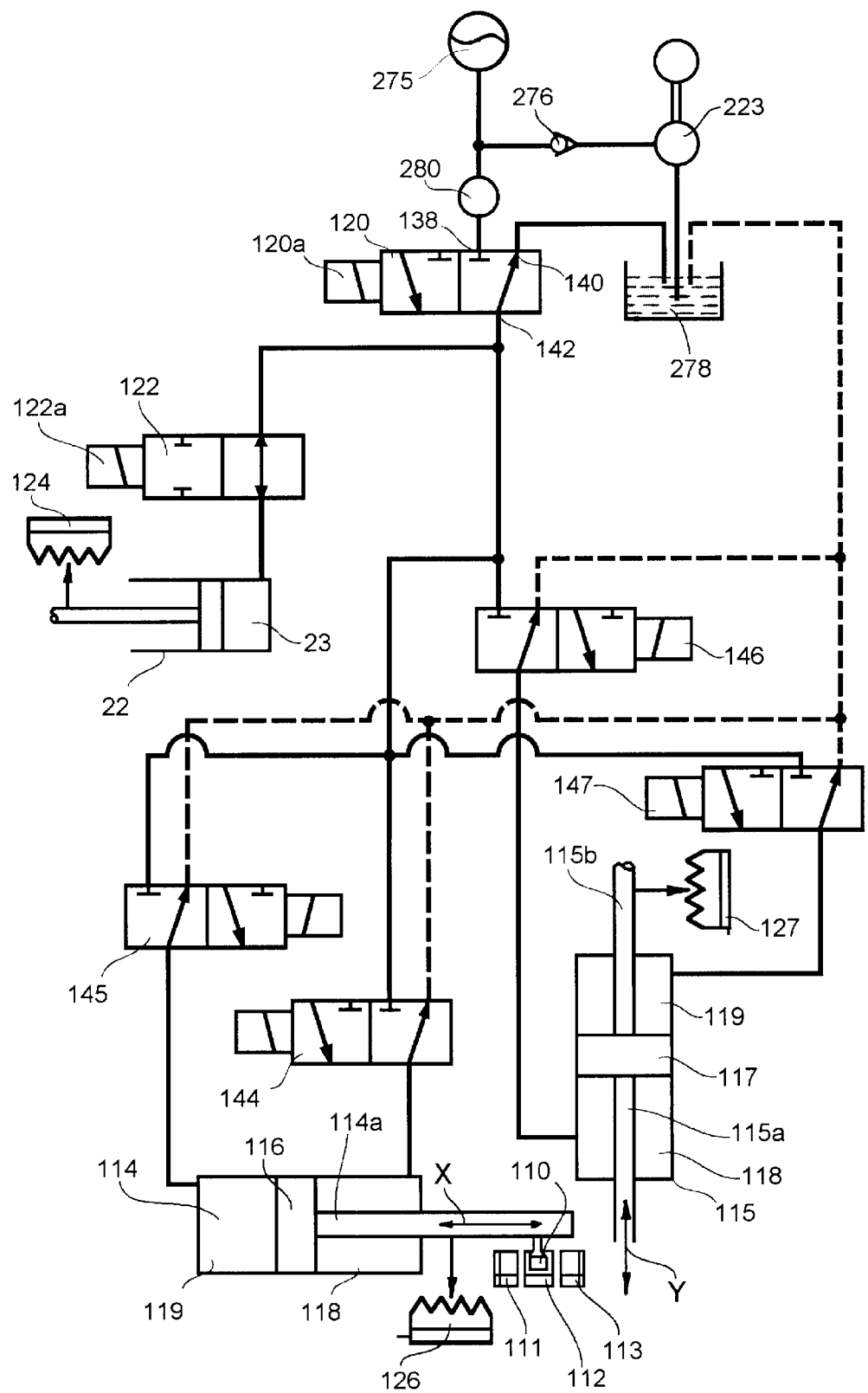
FIG. 3 illustrates diagrammatically the hydraulic actuation system of the transmission system illustrated in FIG. 1.

As illustrated in FIG. 3, selector member 110 is movable in the select direction X by means of a fluid pressure operated select actuator 114, along the neutral plane A-B of the gate illustrated in FIG. 2, to align the select member 110 with one of the shift rails 111, 112, 113, and thereby select a pair of gears associated with that shift rail. The selector member 110 may then be moved in the shift direction Y by means of a fluid pressure operated shift actuator 115, to move the shift rail 111, 112, 113 axially in either direction to engage one of the gear ratios associated therewith.

The select actuator 114 comprises a double-acting ram having a piston 116, which divides the actuator 114 into two working chambers 118, 119, the working chambers 118, 119 being disposed on opposite sides of the piston 116. An operating rod 114a extends from one side of the piston 116 and is operatively connected with the selector member 110 for movement thereof in the select direction X. As a consequence of the connection of operating rod 114a to the piston 116, the working area of pistons 116 exposed to working chamber 118 is smaller than the working area of piston 116 exposed to working chamber 119.

The shift actuator 115 is a double acting ram having a piston 117 which divides the actuator into two working chambers 118 and 119, the working chambers 118, 119 being disposed on opposite sides of the piston 117. An operating rod 115a extends from one side of the piston 117 and is operatively connected with the selector member 110, for movement thereof in the shift direction Y. A balancing rod 115b extends from the other side of the piston 117, so that the working area of piston 117 exposed to working chambers 118 and 119 is balanced.

A main solenoid control valve 120 comprises a two way valve having an inlet 138, an outlet 140 and a port 142. The inlet 138 of the main control valve 120 is connected to a source of hydraulic fluid under pressure, in the form of an accumulator 275. An electrically driven positive displacement pump 223 is provided to charge the accumulator 275, via a non-return valve 276. A pressure transducer 280 measures the pressure in the accumulator 275 and, via control unit 36, controls the electrically driven pump 223 to maintain the pressure in the accumulator at an appropriate level. The outlet 140 from the main control valve 120 is connected to a reservoir 278. When the solenoid 120a of the main control valve 120 is de-energised, the valve 120 connects the outlet 140 to the port 142, the valve 120 connecting the inlet 138 to the port 142 when the solenoid 120a is energised.

The working chamber 23 of the clutch slave cylinder 22 is connected to port 142 of the main control valve 120, via a solenoid clutch control valve 122. The clutch control valve 122 opens the working chamber 23 to port 142, when solenoid 122a of the clutch control valve is de-energised and isolates the working chamber 23 from port 142 of the main control valve 120 when solenoid 122a is energised.

The working chamber 118 of the select actuator 114 is selectively connected to port 142 of the main control valve 120 or to the reservoir 278 by solenoid valve 144;

the working chamber 119 of the select actuator 114 is selectively connected to port 142 of the main control valve 120 or to the reservoir 278 by solenoid valve 145;

the working chamber 118 of the shift actuator 115 is selectively connected to port 142 of the main control valve 120 or to the reservoir 278 by solenoid valve 146; and the working chamber 119 of the shift actuator 115 is selectively connected to port 142 of the main control valve 120 or to the reservoir 278 by solenoid valve 147.

The solenoid valves 144, 145, 146 and 147 connect to respective working chambers 118, 119 of the select and shift actuators 114, 115 to the reservoir 278 when de-energised and to port 142 of the main control valve 120, when energised.

When the transmission is in gear and the clutch 14 is engaged, the main control valve 120, clutch control valve 122 and gear control valves 144, 145, 146 and 147 are all de-energised. In this condition the working chamber 23 of clutch slave cylinder 22 is connected to reservoir 278 via valves 122 and 120, and the working chambers 118, 119 of the select and shift actuators 114, 115 are connected to reservoir 278 via valves 144, 145, 146 and 147. The clutch and gear engagement actuators 22, 114, 115 are thereby depressurised and the accumulator is isolated from the actuators 22, 114, 115 by the main control valve 120.

When a gear change is initiated by, for example, the driver of the vehicle moving the gear selector lever 24 momentarily to the "+" position, or by automatic initiation, the main control valve 120 is energised, connecting the working chamber 23 of the clutch slave cylinder 22 to the accumulator 275, thereby applying hydraulic pressure thereto to disengage the clutch 14. During this period the valves 144, 145, 146 and 147 remain de-energised so that working chambers 118, 119 of the select and shift actuators 114, 115 remain connected to the reservoir 278 and no pressure is applied across the pistons 116, 117.

When the clutch 14 is fully disengaged, solenoid valve 122 is energised, so that the connection between the working chamber 23 and the accumulator 275 is closed and the clutch 14 is clamped in the disengaged position. Upon disengagement and clamping of the clutch 14, depending on the gear currently engaged, one of the solenoid valves 146 or 147 are energised to connect the associated working chamber 118, 119 of the shift actuator 115 to the accumulator 275. Energisation of solenoid valve 146 will open working chamber 118 of shift actuator 115 to the accumulator 275 thereby causing the rod 115a to move upwardly as illustrated in FIG. 3, while energisation of solenoid valve 147 will open working chamber 119 of shift actuator 115 to the accumulator 275 thereby causing the rod 115a to move downwardly as illustrated in FIG. 3. A position sensor in the form of a linear potentiometer 127 is associated with rod 115b and provides a signal indicative of the position of the piston 117. The currently engaged gear may thereby be disengaged by movement of the shift actuator 115 from the position corresponding to the currently engaged gear to a position corresponding to the neutral plane A-B.

If the desired new gear is controlled by the same shift rail 111, 112, 113 as the gear disengaged, for example when changing from 1st. to 2nd., then the energised solenoid valve 146, 147 may remain energised until actuator 115 has moved past the position corresponding to the neutral plane A-B and to the position corresponding to the new gear. The energised solenoid valve 146, 147 is then de-energised, so that both sides of piston 117 are connected to the reservoir 278 and actuator 115 stops moving. If however the new gear is controlled by a different shift rail 111, 112, 113, for example when changing from 2nd. to 3rd., then when piston 117 reaches a position corresponding to the neutral plane A-B, the energised solenoid valve 146, 147 is de-energised, so that both sides of piston 117 are connected to the reservoir 278 and piston 117 stops at the neutral plane A-B. One or both of the solenoid valves 144, 145 of the select actuator 114 may now be energised, causing the piston 116 to move in an appropriate direction to engage the shift rail 111, 112, 113 corresponding to the new gear desired. It should be noted that with the select actuator 114 described, due to the differential piston area, the actuator may be moved to the left as illustrated by in FIG. 3, by energising solenoid valve 144 while solenoid valve 145 remains de-energised; or to the right as illustrated in FIG. 3 by energising solenoid valve 145 while solenoid valve 144 is energised or deenergised.

Again a linear potentiometer 126 is associated with the select actuator 114, the potentiometer 126 providing a signal indicative of the position of the piston 116. When the piston 116 is in a position corresponding to the desired shift rail 111, 112, 113 both solenoids 144 and 145 are de-energised connecting both sides of piston 116 to the reservoir 278 and causing actuator 114 to stop. One side of the shift actuator 115 may now be pressurised by energisation of one of solenoid valves 146 or 147 to engage the new gear, the solenoid valve 146, 147 being de-energised once the new gear has been engaged.

When the new gear has been engaged solenoid valves 120 and 122 may be deenergised connecting the working chamber 23 of clutch slave cylinder 22 to the reservoir 278 and allowing the clutch 14 to re-engage. The rate at which the clutch is re-engaged may be controlled to provide smooth take-up of drive, for example as described in EP0038113; EP0043660; EP0059035; EP0101220 or WO92/13208, by rapidly switching between the energised and de-energised states of solenoid valve 120.

Accorded to a preferred embodiment of the invention, the positions of the select and shift actuators 114, 115 for each of the gear ratios and the neutral plane A-B are calibrated and the potentiometers 126 and 127 are used in a closed loop control system, to control valves 144, 145, 146 and 147, to move the pistons 116 and 117 of the select and shift actuators 114, 115 to predetermined positions, in order to disengage the currently selected gear and engage the new gear.

Figure 4:
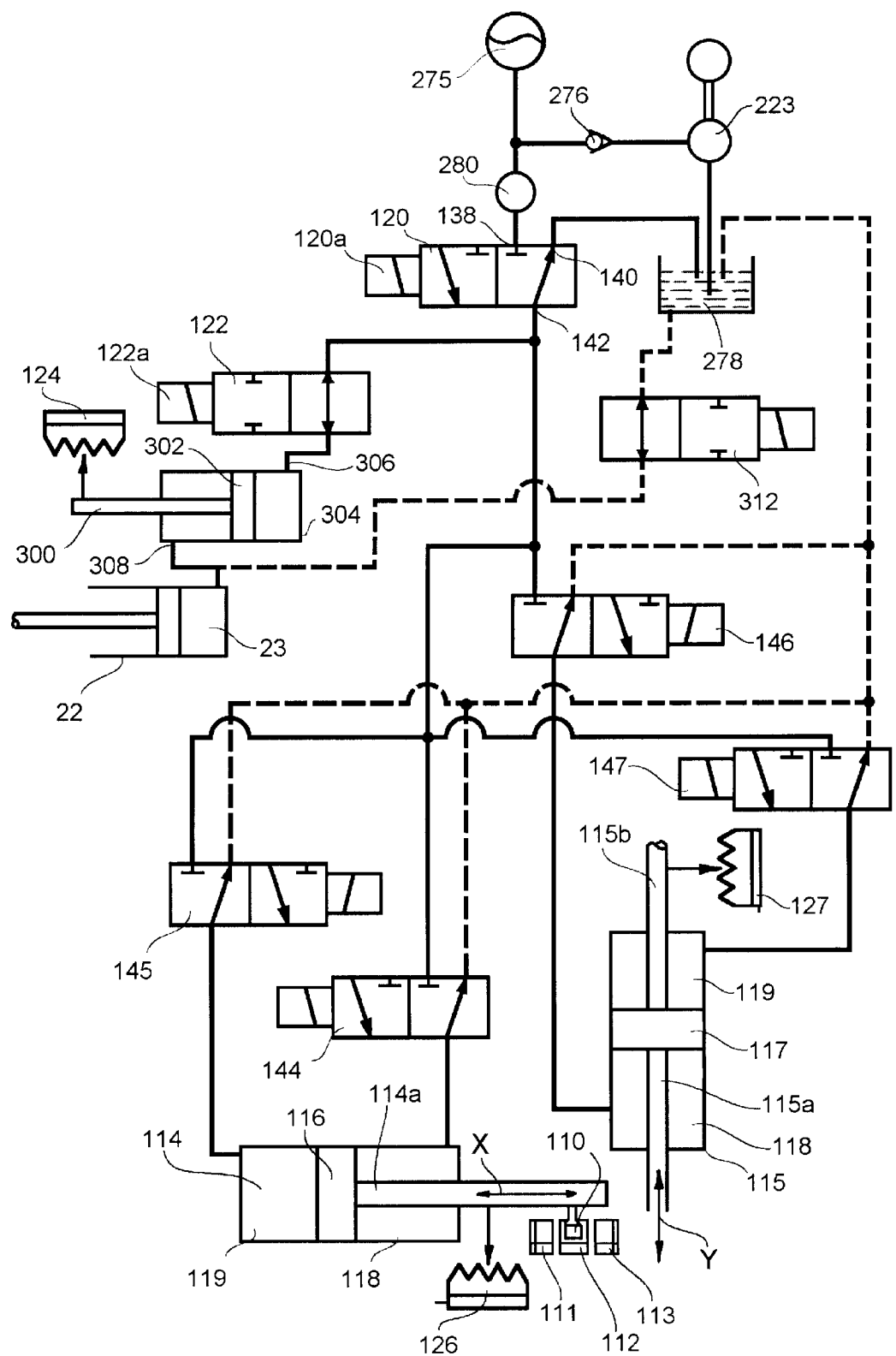
FIG. 4 illustrates diagrammatically a modification to the hydraulic actuation system of the transmission system illustrated in FIG. 1

In the modification illustrated in FIG. 4 a displacement valve 300 is positioned between the valve 122 and the clutch slave cylinder 22. As disclosed in EP0702760 whose content is expressly incorporated in the disclosure content of the present application, this displacement valve permits the location of a clutch position sensor 124 at a position remote from the clutch slave cylinder 22, where spatial restraints prevent such a sensor being positioned with the clutch slave cylinder, as illustrated in FIG. 3.

The displacement valve 300 comprises a piston 302 slidably sealed in a cylinder 304. The cylinder 304 is connected on one side of piston 302 to the solenoid valve 122 via port 306 and on the other side of the piston 302 to the working chamber 23 of clutch slave cylinder 22 via port 308. Port 308 is further connected to the reservoir 278 via a solenoid valve 312. The solenoid valve 312 when de-energised connects the cylinder 304 and working chamber 23 of clutch slave cylinder 22 to the reservoir 278; and when energised isolates the cylinder 304 and working chamber 23 from the reservoir 278.

With this modified embodiment, when the transmission is in gear with the clutch 14 engaged, valve 312 remains de-energised as illustrated in FIG. 4, the cylinder 304 and working chamber 23 are consequently connected to the reservoir 278 permitting fluid to be delivered thereto, to replenish any fluid that has leaked therefrom and to accommodate wear in the clutch 14 and clutch actuation mechanism. Upon initiation of a gear change, the solenoid valve 312 is first energised and remains energised until the gear change has been completed and the clutch fully re-engaged. The cylinder 304 and clutch slave cylinder 22 are thereby isolated from the reservoir 278. The gear change may now proceed as described above, energisation of the main control valve 120 connecting port 306 of the displacement valve 300 to the accumulator 275, thereby applying pressure to the piston 302 of displacement valve 300, causing the piston to move to the left as illustrated in FIG. 4. Movement of the piston 302 displaces fluid from cylinder 304 of the displacement valve 300 to the working chamber 23 of clutch slave cylinder 22 and disengages the clutch 14. The movement of piston 302 thereby corresponds the movement of the piston of the clutch slave cylinder 22 and the position sensor 124 will give a signal corresponding to the position of the clutch 14. Similarly on de-energisation of the main control valve 120 fluid will be returned from cylinder 304 allowing piston 302 to move to the right as illustrated in FIG. 4 and fluid to be returned from working chamber 23 to cylinder 304 thereby allowing the clutch 14 to re-engage.

According to a preferred embodiment of the invention the main control valve 120, the solenoid valves 122, 144, 145, 146, 147 and 312, the cylinders of the select and shift actuators 114, 115, and/or the cylinder 304 of the displacement valve 300, may be defined by a common housing, the bores/cylinders of the various components being appropriately inter-connected by passages through the common housing. The valve/actuator pack so formed would be mounted on or adjacent the gearbox 12.

The electrically driven pump 223, accumulator 275, reservoir 278 and control unit 36 may also be mounted with the valve/actuator pack or may be mounted remotely thereof and inter-connected thereto by, for example, elastomeric pressure hoses.

Various modifications may be made without departing from the invention. For example, while in the above embodiment the hydraulic circuit has been described with reference to a semi-automated transmission system, the invention is equally applicable to fully-automated transmission systems or to automated manual transmission systems.

While in the above embodiments the select actuator 114 has been described as a double acting ram with differential piston areas and the shift actuator 115 as a double acting ram with balanced areas, either type of actuator may be used for either application.

The patent claims submitted with the application are proposed formulations without prejudice to the achievement of further patent protection. The applicant reserves the right to submit claims for further combinations of characteristics, previously only disclosed in the description and/or drawings.

References back used in sub-claims refer to the further development of the subject of the main claim by the characteristics of the respective sub-claim; they are not to be understood as a waiver with regard to achieving independent item protection for the combination of characteristics in the related sub-claims.

Since the subject of the sub-claims can form separate and independent inventions with reference to the prior art on the priority date, the applicant reserves the right to make them the subject of independent claims or of division declarations. Furthermore, they may also contain independent inventions which demonstrate a design which is independent of one of the objects of the preceding sub-claims.

The embodiments are not to be considered a restriction of the invention. Rather, a wide range of amendments and modifications is possible within the scope of the current disclosure, especially those variations, elements and combinations and/or materials which, for example, the expert can learn by combining individual ones together with those in the general description and embodiments in addition to characteristics and/or elements or process stages described in the claims and contained in the drawings with the aim of solving a task thus leading to a new object or new process stages or sequences of process stages via combinable characteristics, even where they concern manufacturing, testing and work processes.

What is claimed is:

1. A hydraulic actuation system for an automated transmission system comprising:
    a source of hydraulic fluid under pressure;
    a hydraulic fluid reservoir;
    a hydraulic clutch actuator for controlling engagement of a clutch, said hydraulic clutch actuator comprising a single acting ram with a single working chamber;
    a hydraulic gear engagement actuator for controlling engagement of a gear, said hydraulic gear engagement actuator comprising a double acting ram comprising first and second working chambers;
    a main control valve, the main control valve being switchable between a first position in which the clutch actuator and gear engagement actuator are connected to the source of fluid under pressure and a second position in which the clutch actuator and gear engagement actuator are connected to the reservoir;
    the working chamber of the clutch actuator being connected to the main control valve via a clutch control valve, the clutch control valve being switchable between a open position in which the working chamber of the clutch actuator is connected to the main control valve and a closed position in which the working chamber of the clutch actuator is isolated from the main control valve;
    the first and second working chambers of the gear engagement actuator being selectively connected to the main control valve or to the reservoir via first and second gear control valves respectively.

2. A hydraulic actuation system according to claim 1 in which the main control valve is in its second position when a solenoid associated therewith is de-energized.

3. A hydraulic actuation system according to claim 2, in which the clutch control valve is in its open position when the solenoid is de-energised.

4. A hydraulic actuation system according to claim 1 in which the clutch control valve is in its open position when a solenoid associated therewith is de-energized.

5. A hydraulic actuation system according to claim 1 in which the first and second gear control valves connect the working chambers of the gear engagement actuator to the reservoir when solenoids associated therewith are de-energized.

6. A hydraulic actuation system according to claim 1 in which a gear engagement mechanism includes two gear engagement actuators, a select actuator for moving a select member in a first direction and a shift actuator for moving the select member in a second direction, the select and shift actuators having independent first and second gear control valves.

7. A hydraulic actuation system according to claim 1 wherein the double-acting ram of the gear engagement actuator includes a piston, the working area on one side of the piston being greater than that of the other side of the piston.

8. A hydraulic actuation system according to claim 1 wherein the double-acting ram of the gear engagement actuator includes a piston, the working area on one side of the piston being equal to that of the other side of the piston.

9. A hydraulic actuation system according to claim 1 in which a displacement valve is positioned between the main control valve and the clutch actuator, the displacement valve comprising a piston slidably sealed in a cylinder, the cylinder being connected on one side of the piston to the main control valve and on the other side of the piston to the working chamber of the clutch actuator.

10. A hydraulic actuation system according to claim 8 in which the cylinder of the displacement valve on said other side of the piston is also connected to the reservoir via a solenoid valve, said solenoid valve in an open position connecting the cylinder of the displacement valve on said other side of the piston and the working chamber of the clutch actuator to the reservoir and in a closed position isolating the cylinder of the displacement valve on said other side of the piston and the working chamber of the clutch actuator from the reservoir.

11. A hydraulic actuation system according to claim 9 in which the solenoid valve is in its open position when the solenoid is de-energised.

12. A hydraulic actuation system according to claim 8 in which a position sensor is provided on the displacement valve, the position being used in a closed loop control system to control the position of the clutch.

13. A hydraulic actuation system according to claim 1 in which a plurality of the components are defined by common housing, the components being interconnected with one another in appropriate manner by passageway formed in the common housing.

14. An automated transmission system including a hydraulic actuation system as claimed in claim 1.

* * * * *